(12) United States Patent
Yamaguchi

(10) Patent No.: US 8,982,368 B2
(45) Date of Patent: Mar. 17, 2015

(54) IMAGE FORMING APPARATUS

(75) Inventor: Yasunaga Yamaguchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 342 days.

(21) Appl. No.: 13/357,631

(22) Filed: Jan. 25, 2012

(65) Prior Publication Data

US 2012/0194840 A1    Aug. 2, 2012

(30) Foreign Application Priority Data

Jan. 27, 2011 (JP) .................................. 2011-014869

(51) Int. Cl.
*G06F 3/12* (2006.01)
*H04N 1/00* (2006.01)

(52) U.S. Cl.
CPC ......... *H04N 1/00899* (2013.01); *H04N 1/0096* (2013.01); *H04N 2201/0094* (2013.01)
USPC ........................................................ 358/1.13

(58) Field of Classification Search
CPC .................. H04N 2201/04791; H04N 1/0443; H04N 1/1013; H04N 1/1017
See application file for complete search history.

(56) References Cited

U.S. PATENT DOCUMENTS

| | | | |
|---|---|---|---|
| 5,805,312 A | 9/1998 | Ozawa et al. | |
| 6,348,982 B2 * | 2/2002 | Iseki et al. | 358/475 |
| 6,408,149 B1 | 6/2002 | Taira et al. | |
| 7,624,288 B2 * | 11/2009 | Kishi et al. | 713/300 |
| 2009/0010671 A1 | 1/2009 | Hashimoto | |
| 2011/0004776 A1 | 1/2011 | Tanaka | |
| 2011/0320842 A1 * | 12/2011 | Narushima et al. | 713/323 |

FOREIGN PATENT DOCUMENTS

| | | |
|---|---|---|
| EP | 1005219 A2 | 5/2000 |
| JP | 2000-013567 A | 1/2000 |
| JP | 2005-156777 A | 6/2005 |
| JP | 2009-265255 A | 11/2009 |
| JP | 2009265255 A * | 11/2009 |

* cited by examiner

*Primary Examiner* — Ashish K Thomas
*Assistant Examiner* — Neil R McLean
(74) *Attorney, Agent, or Firm* — Rabin & Berdo, P.C.

(57) ABSTRACT

An image forming apparatus includes a plurality of operation modes. An image reading section reads image information from an original document. An image recording section records the image information on a recording medium. An electric power supply supplies electric power to the image reading section and the image recording section. A controller controls the electric power supply. When the image forming apparatus is operating in a first operation mode where the image recording section is involved, if the controller receives a new operation command that involves the image recording section, the controller drives the image recording section to operate in a second operation mode where the image forming apparatus operates at a lower speed than in the first operation mode.

5 Claims, 11 Drawing Sheets

FIG.5

| OPERATION MODE | POWER CONSUMPTION (watts) | INVOLVED SECTION | | |
| --- | --- | --- | --- | --- |
| | | SCANNER UNIT | PRINT ENGINE | FAX |
| SCAN | 30 | YES | | |
| LOW-SPEED PRINTING | 130 | | YES | |
| HIGH-SPEED PRINTING | 160 | | YES | |
| COPY | 160 | YES | YES | |
| FAX TRANSMISSION | 40 | YES | | YES |
| FAX RECEPTION | 10 | | | YES |

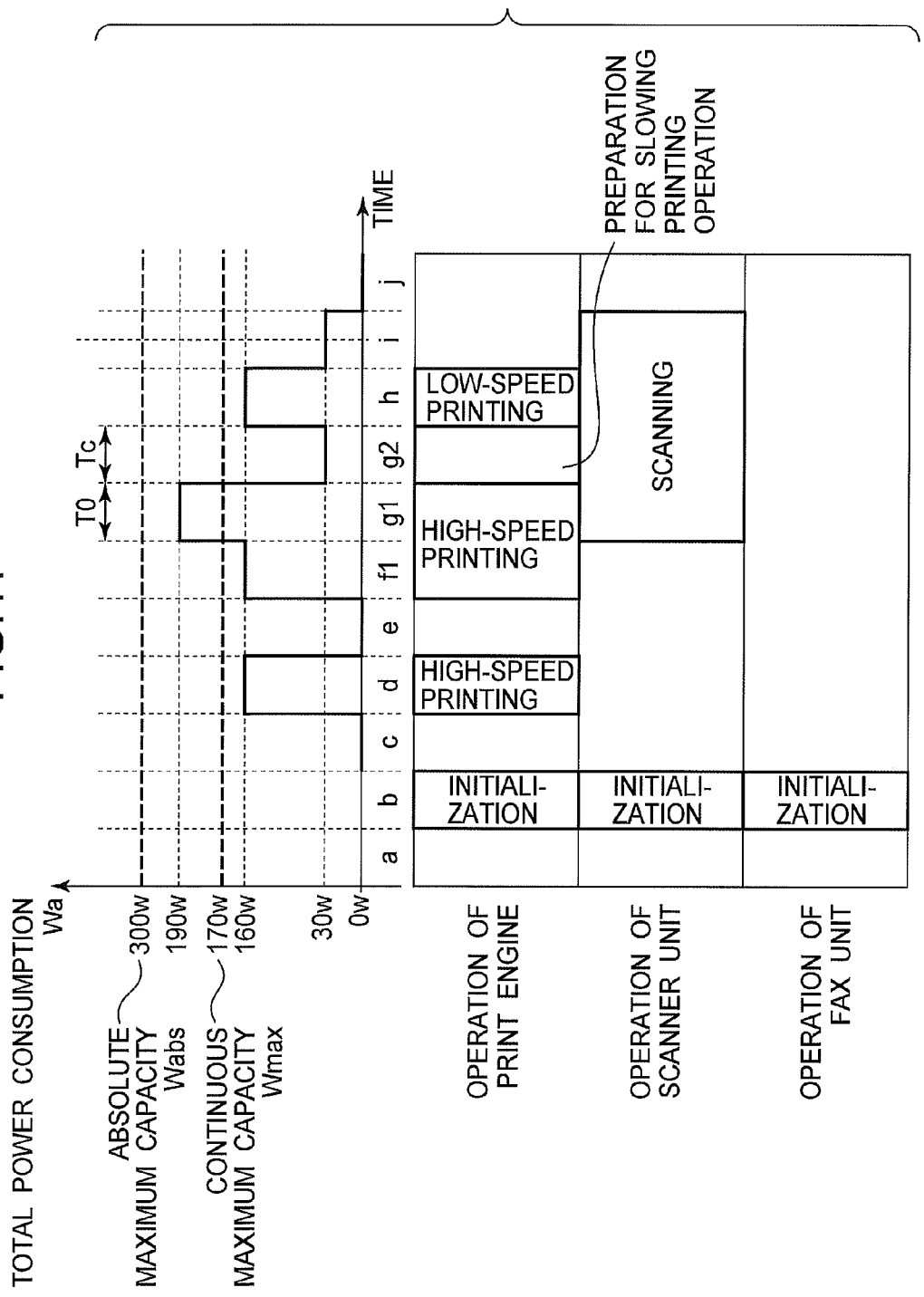

IMAGE FORMING APPARATUS

BACKGROUND OF THE INVENTION

1. Field of the Invention

The present invention relates to an image forming apparatus including an image reading section and an image recording section.

2. Description of the Related Art

Existing image forming apparatus include a printer unit and a scanner unit located above the printer unit. The printer unit and scanner unit receive electric power from a single power supply unit.

One such image forming apparatus is disclosed in Japanese Patent No. 2000-013567, according to which the operation speed of an image reading head in an image reading section is controlled in accordance with the status of an image recording section.

A conventional multi function peripheral/multi function printer incorporates an image reading section and an image recording section. Such an apparatus requires a power supply with a large capacity, so that both the image reading section and image recording section can operate simultaneously.

SUMMARY OF THE INVENTION

An object of the invention is to provide an image forming apparatus in which a small-capacity power supply can supply sufficient electric power to both an image reading section and an image recording section simultaneously.

Another object of the invention is to provide an image forming apparatus in which when the image recording section is performing printing in a first operation mode (high-speed printing mode), if the image reading section receives an operation command, the operation of the image recording section is halted and is then shifted to a second operation mode (low-speed mode). In this manner, a power supply having a limited capacity can still permit the image reading section and image recording section to operate simultaneously.

An image forming apparatus includes a plurality of operation modes. An image reading section reads image information from an original document. An image recording section records the image information on a recording medium selectively in a first operation mode where the image recording section operates at a first speed and in a second operation mode where the image recording section operates at a second speed lower than the first speed. An electric power supply supplies electric power to the image reading section and the image recording section. A controller controls the recording section. When the image forming apparatus is operating in the first operation mode, if the controller receives a new operation command, the controller drives the image recording section to operate in the second operation mode.

An image forming apparatus includes a plurality of operation modes. An image reading section is configured to read image information from an original document. An image recording section is configured to record the image information on a recording medium selectively in a first operation mode where the image recording section operates at a first speed and in a second operation mode where the image recording section operates at a second speed lower than the first speed. An electric power supply is configured to supply electric power to the image reading section and the image recording section. A controller controls the image recording section. When the image recording section is operating in the first operation mode, if the controller receives a new operation command, the controller continues to drive the image recording section to operate in the first operation mode and starts to execute the new command. When the image recording section has completed its operation in the first operation mode, the image recording section enters a cooling mode where the image recording section remains idle for a period of time. The controller drives the image recording section (70) to operate in the second operation mode after the period of time.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 5 illustrates the relationship among the operation modes, power consumption, and involved sections in the first embodiment;

FIG. 11 illustrates the change in the total power consumption after power-on of the image forming apparatus according to the second embodiment.

DETAILED DESCRIPTION OF THE INVENTION

The present invention will be described in detail with reference to the accompanying drawings. It will be understood that it is not intended to limit the invention to the drawings.
{Construction}

Figure 1:
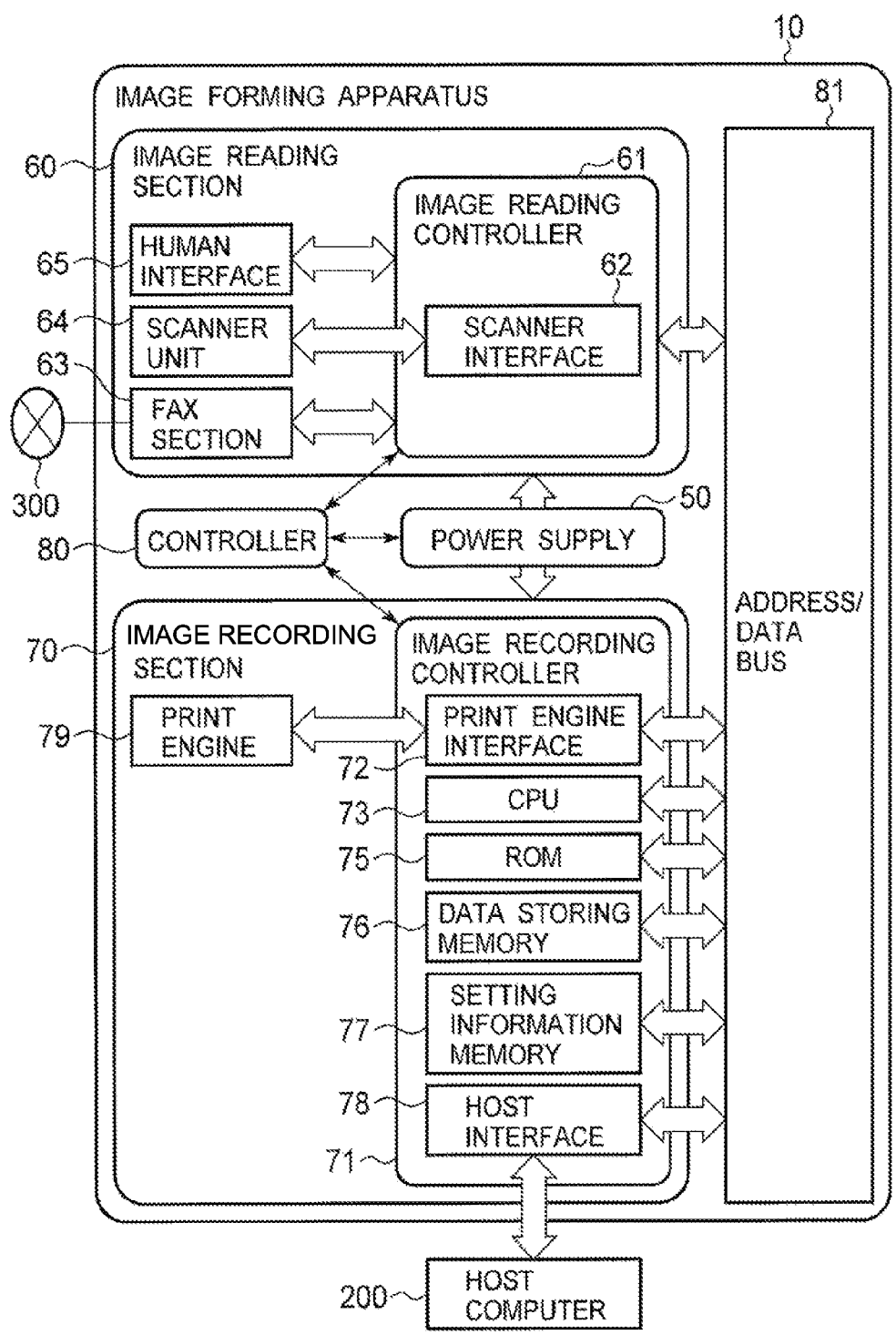
FIG. 1 illustrates the general configuration of an image forming apparatus according to a first embodiment.

FIG. 1 illustrates the general configuration of an image forming apparatus according to a first embodiment.

A multi function image forming apparatus 10 takes the form of, for example, a multi function printer (MFP). A power supply 50 supplies electric power to the respective sections in the image forming apparatus 10. An image reading section 60 reads the image of an original document. An image recording section 70 prints images on printing media. A controller 80 controls the image reading section 60 and image recording section 70. The image reading section 60 and image recording section 70 communicate with each other via an address/data bus 81.

The reading section 60 performs a function of reading image information from an original document 120 (FIG. 2) and a function of communicating image information via a public switched telephone network. The image recording section 70 records image information received from the public switched telephone network, the original document 120, and a host computer 200. The power supply 50 provides electric power to both the image reading section 60 and the image recording section 70.

The image reading section 60 include a facsimile (FAX) section 63, a scanner unit 64 that reads image information from the original document 120, a human interface 65 that receives from the user the command to operate the image forming apparatus 10, and an image reading controller 61 that controls the image reading section 60. The image reading controller 61 includes a scanner interface 62 that transmits image information obtained by the scanner unit 64 to the image recording section 70 via the address data bus 81. The image reading controller 61 communicates with the FAX section 63, scanner unit 64, and human interface 65. The human interface 65 includes a liquid crystal display (LCD) that displays operation statuses, a touch screen through which the user inputs commands and data, and a variety of buttons.

The image reading controller 61 is connected to the address/data but 81, and communicates with an image recording controller 71 of the image recording section 70. The FAX section 63 is connected to the public switched telephone network 300, and communicates with an external FAX apparatus (not shown).

The image recording section 70 has a function of recording images on recording media in accordance with image formation. The image recording section 70 includes a print engine 79 that prints images on the recording media, and an image recording controller 71 that controls the print engine 79. The image recording controller 71 includes a print engine interface 72, a central processing unit (CPU) 73, a read only memory (ROM) 75, a data storing memory 76, a setting information memory 77, and a host interface 78. The print engine interface 72 sends image information to the print engine 79 via the address/data bus 81. The ROM 75 stores the software executed by the CPU 73. The setting information memory 77 stores the settings for the image forming apparatus 10. The host interface 78 receives image information from the host computer 210 via a communication line. The CPU 73 plays a role of forecasting power consumption or predicting the amount of electric power drawn from the power supply 50, and a role of determining whether the predicted power consumption exceeds a continuous maximum capacity Wmax (first value of power output) or an absolute maximum capacity Wabs (second value of power output.

The image reading controller 71 controls the print engine 79 and communicates with the image reading controller 61 via the address/data bus 81.

A controller 80 sends commands to the image reading controller 61 and image recording controller 71 to control the image reading section 60 and image recording section 70. The controller 80 sends commands to the power supply 50 to supply electric power to the image reading section 60 and image recording section 70.

Figure 2:
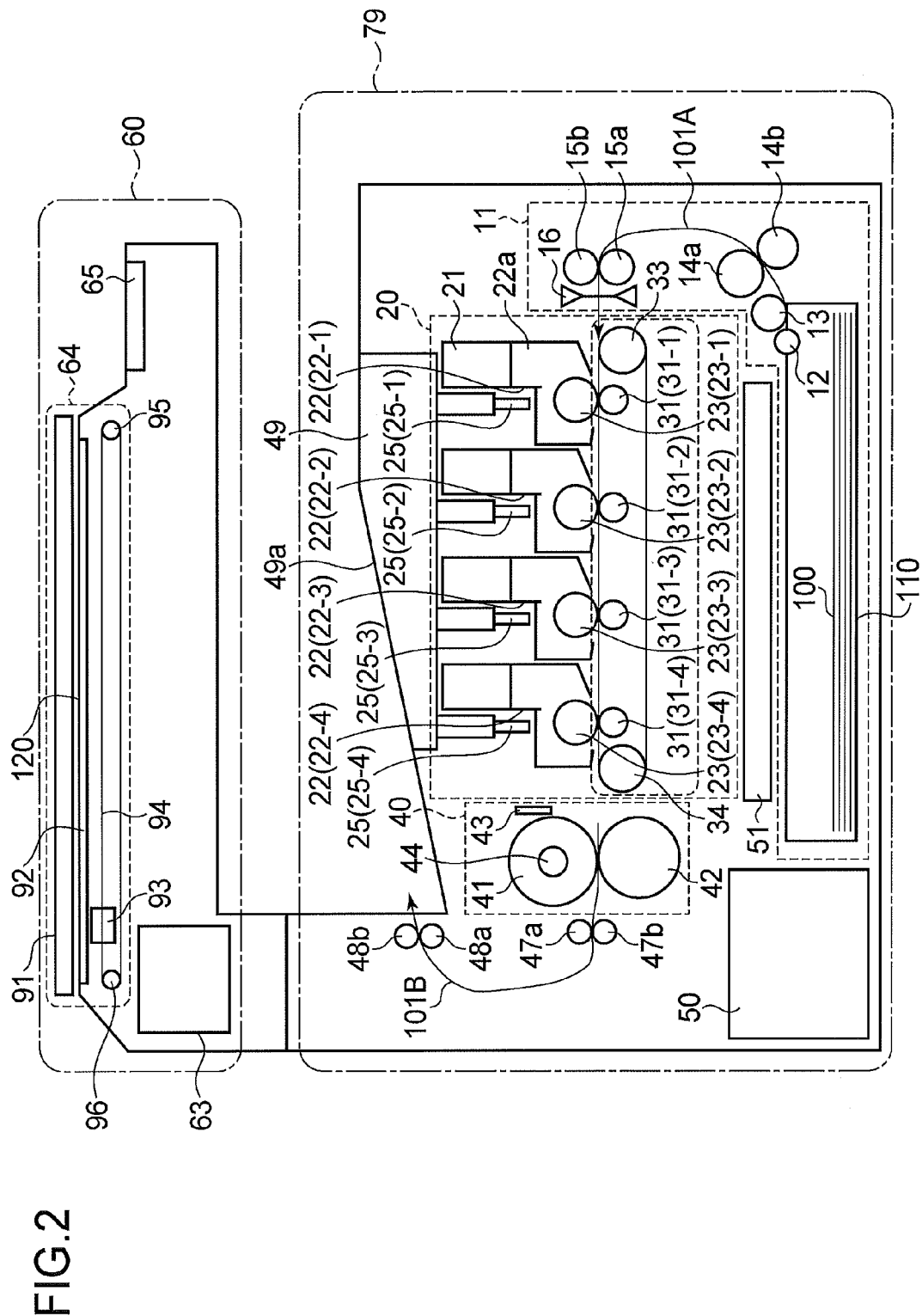
FIG. 2 is a cross-sectional view of the image forming apparatus according to the first embodiment.

FIG. 2 is a cross-sectional view of the image forming apparatus 10 according to the first embodiment. The reading section 60 located on an upper portion of the image forming apparatus 10, the print engine 79 of the image recording section 70 located under the image reading section 60, and the power supply 50 that supplies electric power to the image recording section 70 and image reading section 60. The image reading section 60 includes the scanner unit 64 on top of the image forming apparatus 10, FAX section 63, and human interface 65 located near the scanner unit 64.

The scanner unit 64 includes a document retaining plate 91 that is openable and covers the original document 120, an platen glass 92 on which the original document 120 is placed, a carriage unit 93 located under the platen glass 92, a drive belt 94 fixed to the carriage unit 93, a stepping motor 95 that drives the drive belt 94 to run, and a pulley 96. The drive belt 94 is disposed about a stepping motor 95 and the pulley 96. The carriage unit 93 includes a cold cathode tube as a light source for irradiating the original document 120 and for forming an optical image, and a line sensor constituted of charge coupled devices (CCDs) aligned in line.

The human interface 65 includes a display unit in the form of, for example, a liquid crystal display (LCD) or light emitting diodes (LEDs), and a touch screen through which the user inputs commands, and a variety of buttons arranged around the displaying unit via which the user commands the apparatus. The user operates the human interface 65 to input a variety of commands into the image forming apparatus 10.

The print engine 79 includes a paper feeding mechanism 11 for feeding the print media (e.g., paper) 100, and image forming section 20 that forms toner images on the recording paper 100, a fixing unit 40 that fixes the toner images on the recording paper 100, paper discharging section that discharges the recording paper 100, and a stacker 49a that supports a stack of the recording paper 100 discharged from the image forming apparatus 10. The print engine 79 includes a motor (not shown) that drives respective rollers in rotation, a clutch that connects and disconnects mechanical driving forces to the rollers disposed along the transport paths 101A and 101B, a high voltage power supply 51 that is located under the image forming section 120 and supplies high voltages of 200-5000 volts, and a cover 49 located above the print engine 79 and configured to open and close. A plurality of LED heads 25 (25-1 to 25-4), which serve as an exposing unit, are mounted to the under side of the cover 49. The stacker 49a is located on the top of the cover 44 and supports the stack of discharged print media thereon.

The paper feeding mechanism 11 includes a paper cassette 110 disposed at a lower portion of the image forming apparatus 10, feed roller 12 that picks up the print medium on a sheet-by-sheet basis from the paper cassette 110, separation roller 13, a pair of rollers 14a and 14b, a pair of rollers 15a and 15b, and a position sensor (start-to-write position sensor) 16.

The paper cassette 110 holds a plurality of sheets of recording paper 100, and is detachably attached to the lower portion of the image forming apparatus 10. The recording paper 100 includes quality paper, recycled paper, calendered paper, matte paper, and transparency (OHP).

The feed roller 12 rotates in pressure contact with the recording paper 100, and cooperates with a separation roller 13 downstream of the feed roller 12 with respect to the direction of travel of the recording paper 100. The transport rollers 14a and 14b cooperate with each other to hold the recording paper 100 between them in a sandwiched relation, and are downstream of the separation roller 13. The transport rollers 15a and 15b cooperate with each other to hold the recording paper 100 between them in a sandwiched relation and are downstream of the transport rollers 14a and 14b. The transport rollers 14a and 14b and the transport rollers 15a and 15b are aligned along the transport path 101A, and are driven by a motor (not shown). The position sensor (start-to-write position sensor) 16 is downstream of the transport rollers 15a and 15b.

The image forming section 20 includes four image forming units 22-1 (K), 22-2 (Y), 22-3 (M), and 22-4 (C) aligned from upstream to downstream. LED heads 25-1, 25-2, 25-3, and 25-4 are disposed above corresponding image forming units 22-1 (K), 22-2 (Y), 22-3 (M), and 22-4 (C). Transfer units 22-1, 22-2, 22-3, and 22-4 are disposed under corresponding image forming units 22-1 (K), 22-2 (Y), 22-3 (M), and 22-4 (C).

Figure 3:
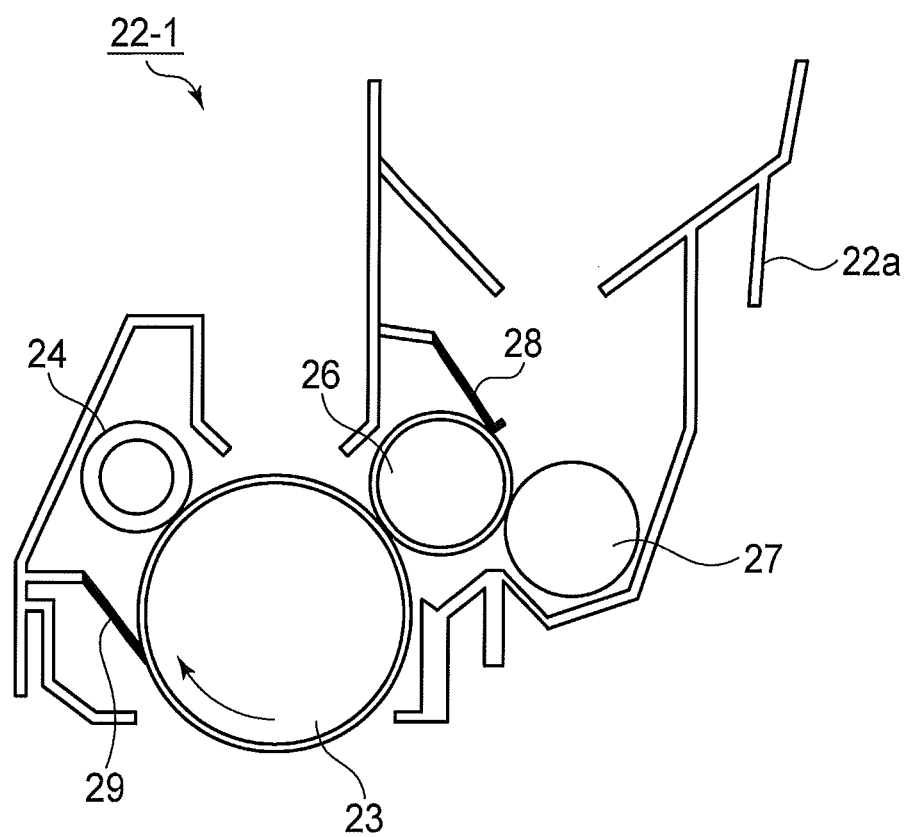
FIG. 3 illustrates the image forming unit body of the black image forming unit.

Each of the image forming units 22-1 (K), 22-2 (Y), 22-3 (M), and 22-4 (C) includes an image forming unit body 22a, a toner cartridge 21 that holds a developer material of a corresponding color. The toner cartridge 21 is detachably attached to the upper portion of the image forming unit body 22a. FIG. 3 illustrates the image forming unit body 22a of the image forming unit 21-1 (K). The image forming unit body 22a includes a photoconductive drum 23-1, a charging roller 24, a developing roller 26, a toner supplying roller 27, a developing blade 28, and a cleaning blade 29.

The transfer unit 30 includes transfer rollers 31-1, 31-2, 31-3, and 31-4, a drive roller 33, a driven roller 34, a transport belt 32 disposed about the drive roller 33 and driven roller 34. The transport belt 32 transports the recording paper 100 and also serves as a transferring body that transfers the toner image from the photoconductive drum 23 onto the recording paper 100. The transport belt 32 is sandwiched between the photoconductive drum 23 and transfer rollers 31.

The fixing unit 40 includes a heat roller 41, a pressure roller 42, and a temperature detecting sensor 43, and a halogen heater 44. The heat roller 41 incorporates a halogen lamp 44 therein. A temperature detecting sensor 43 is located on the surface of the heat roller 41 upstream with respect to the direction of travel of the recording paper 100. The temperature detecting sensor 43 takes the form of a thermistor, and detects the surface temperature of the heat roller 41.

The paper discharging section includes a pair of transport rollers 47a and 47b, a pair of discharging rollers 48a and 48b, which are located downstream of the fixing unit 40 and are driven by a motor (not shown) to transport the recording paper 100 therebetween in a sandwiched relation.

FIG. 3 illustrates the configuration of the image forming unit according to the first embodiment.

The charging roller 24 uniformly charges the surface of the photoconductive drum 23. The developing roller 26 holds the toner thereon and supplies the toner to the photoconductive drum 23. The toner supplying roller 27 supplies the toner to the developing roller 26. The developing blade 28 forms a thin layer of the toner on the developing roller 26. The cleaning blade 29 removes the residual toner on the photoconductive drum 23 after transfer of the toner image onto the recording paper 100. The image forming unit body 22a has a recess above the toner supplying roller 27, the recess receiving the toner cartridge 21. The image forming unit body 22a has an opening above the photoconductive drum 23 through which the LED head 25 (FIG. 2) illuminates the charged surface of the photoconductive drum 23.

The photoconductive drum 23 is a rotatable body that includes a core formed of, for example, a cylinder of aluminum, a photosensitive layer formed thereon. The photosensitive layer includes a charge generation layer and a charge transport layer. The charging roller 24 and developing roller 26 rotate in contact with the photoconductive drum 23, and the widthwise free end of the cleaning blade 29 abuts the surface of the photoconductive drum 23. When the exposing unit or LED head illuminates the charged surface of the photoconductive drum 23 in accordance with image data, an electrostatic latent image is formed on the photoconductive drum 23. The photoconductive drum 23 cooperates with the transfer rollers 31 to hold the transfer belt 32 therebetween. The configuration of the image forming unit 22 will be described in detail.

The charging roller 24 is a cylindrical member and is rotatable in pressure contact with the photoconductive drum 23. The charging roller 24 includes a metal shaft covered with a semiconductive rubber material, e.g., silicone. The charging roller 24 receives high voltage from a high voltage power supply 51, thereby applying a predetermined voltage to the photoconductive drum 23 to charge uniformly the surface of the photoconductive drum 23.

The LED head 25 includes LED array chips, a rod lens array, an LED driver circuit, and is located above the photoconductive drum 23. The LED head 25 irradiates the charged surface of the photoconductive drum 23 with light to form an electrostatic latent image on the photoconductive drum 23.

The toner supplying roller 27 is a cylindrical member including a metal shaft covered with a layer of rubber. The toner supplying roller receives high voltage from the high voltage power supply 51, and rotates in pressure contact with the developing roller 26 so that the toner is supplied to the developing roller 26.

The developing roller 26 is a cylindrical member including a metal shaft covered with a layer of semiconductive urethane rubber. The developing roller 26 receives high voltage from the high voltage power supply 51 and the toner from the toner supplying roller 27. The developing roller 26 rotates in contact with the photoconductive drum 23.

The developing blade 28 is a blade-like member made of, for example, stainless steel, and has a widthwise end portion in contact with the surface of the photoconductive drum 23. The developing blade 28 forms a thin layer of toner on the developing roller 26.

The cleaning blade 29 is a plate-like member formed of a rubber material and has a widthwise end abutting the surface Of the photoconductive drum 23. The cleaning blade 29 scrapes the residual toner on the photoconductive drum 23 after transferring the toner image from the photoconductive drum 23 onto the recording paper 100.

{Operation}

Operation of the scanner unit 64 of the image forming apparatus 10 will be described with reference to FIG. 2.

The original document 120 has a white sheet attached thereto. The original document 120 is placed on the platen glass 92 with the white sheet pressing the original document 120 in position against the platen glass 92, so that the original document 120 is in close contact with the platen glass 92. The drive belt 94 is fixed to the carriage unit 93 across the width of the drive belt 94. The drive belt is disposed about the pulley 96 and the stepping motor 95.

The stepping motor 95 rotates to drive the drive belt 94 to run so that the carriage unit 93 slides along the platen glass 92. The cold cathode tube in the carriage 93 illuminates the image on the original document 120, and receives light reflected back from the original document 120 so that the optical system forms an image on the CCD line sensor. In this manner, the CCD line sensor obtains the one dimensional optical image of the original document 120, the optical image extending in a direction substantially perpendicular to the direction in which the carriage unit 93 moves. Since the carriage moves along the platen glass 92, the image of the original document 120 can be obtained in the form of a two-dimensional image.

The printing operation of the image forming apparatus 10 will be described with reference to FIGS. 1-3. The recording paper 100 is transported from upstream to downstream in the transport paths 101a and 101B. The cassette 110 is located at the most upstream end and the stacker 49a is located at the most downstream end.

The image forming apparatus 10 communicates with the host computer 200 by cable or by wireless communication. Upon reception of print data and a print command from the host computer 200, a pick up motor (not shown) drives the feed roller 12 to rotate, which in turn feeds the sheets of the recording paper 100 on a sheet-by-sheet basis into the transport path 101A. The recording paper 100 passes through the image forming units 22-1, 22-2, 22-3, and 22-4 in this order. The respective image forming units start to rotate their rolling members and drive their photoconductive drum to make at least one complete rotation.

When a separation roller 13 is driven in rotation by a motor (not shown), the recording paper 100 transported by the feed roller 12 the separation roller 13 transports the recording paper 100 further. The recording paper 100 is further transported by the rollers 14a and 14b and rollers 15a and 15b downstream of the transport path 101a, and then causes the position sensor (start-to-write position sensor) 16. Predetermined periods of time after the start-to-writ sensor 16 detects the recording paper 100, LED head 25s of the four image forming units 22-1, 22-2, 22-3, and 22-4 start to illuminate the corresponding photoconductive drums 23-1, 23-2, and 23-3, 23-4, respectively, to form electrostatic latent images of corresponding colors.

The recording paper 100 is transported by the transport belt 32 disposed downstream of the transport path 101A. The roller 33 rotates to drive the transport belt 32, disposed about the drive roller 33 and driven roller 34, to run. The transport belt 32 transports the recording paper 100 thereon, passing through the respective image forming units 22-1, 22-2, 22-3, and 22-4 in sequence. The respective image forming units start to rotate their rolling members and drive their photoconductive drums to make at least one complete rotation.

FIG. 3 illustrates the image forming units 22-1. Each of the image forming units 22-1, 22-2, 22-3, and 22-4 may be substantially identical; for simplicity only the operation of the image forming unit 22-1 will be described, it being understood that the other image forming units 22-2, 22-3, and 22-4 may work in a similar fashion. The photoconductive drum 23 rotates clockwise while being charged uniformly by the charging roller 24. The LED head 25 illuminates the uniformly charged surface of the photoconductive drum 23 to form an electrostatic latent image on the photoconductive drum 23. The developing roller 26 supplies the toner to the photoconductive drum 23 to develop the electrostatic latent image with the toner into a toner image. The transfer roller 31 receives a high voltage in the range of +1000 to 3000 volts which creates an electric field in a direction in which the toner image is pulled toward the transfer roller 31. In this manner, the toner image is transferred onto the recording paper 100 positioned between the photoconductive drum 23 and the transfer roller 31. The recording paper 100 with the toner image thereon is transported by the transport belt 32 to the fixing unit 40. The residual toner on the photoconductive drum 23 is scraped off before a new electrostatic latent image is formed on the photoconductive drum 23.

The recording paper 100 passes through the respective image forming units in sequence so that the toner images of corresponding colors are transferred onto the recording paper 100 in registration. The recording paper 100 then passes through a fixing point defined between the heart roller 41 and the pressure roller 42, where the toner images are fused into a permanent image under heat and pressure.

The recording paper 100 is then transported by the transport roller 47a and 47b and the discharge rollers 48a and 48b through the transport path 101B, and is finally discharged onto the stacker 49a.

Figure 4:
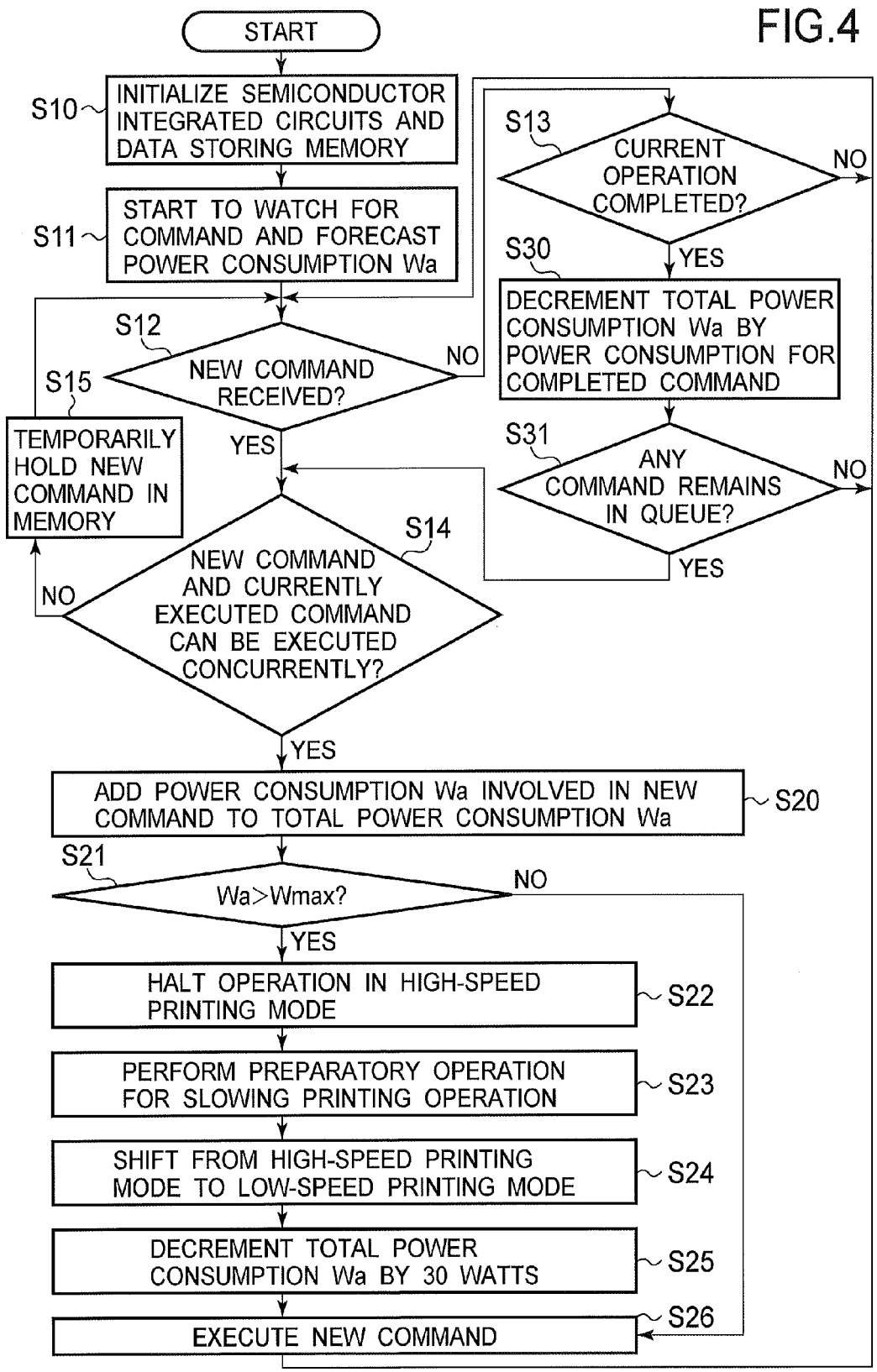
FIG. 4 is a flowchart illustrating the operation of the image forming apparatus of the first embodiment.

FIG. 4 is a flowchart illustrating the operation of the image forming apparatus 10. Upon power-up, the power supply 50 supplies electric power to the respective sections in the image forming apparatus 10, and the CPU 73 starts a variety of processes.

In S10, the CPU 73 initializes the semiconductor integrated circuits and a data storing memory 76. The CPU 73 also initializes the print engine 79, scanner unit 64 and FAX section 63, so that the print engine 79 can communicates with the scanner unit 64 and the FAX section 63.

In S11, the CPU 73 starts to watch for a command, thereby forecasting power consumption Wa in the image forming apparatus 10. The image forming apparatus 10 enters a standby state. Any new operation command is sent from the human interface 65, FAX section 63, and host computer 200 to the CPU 73 via the address/data bus 81. The CPU 73 sets total power consumption Wa held in the setting information memory 77 to 0 watts.

The CPU 73 adds power consumption involved in the new operation command to the forecast power consumption Wa. Then, the CPU 73 checks whether the forecast power consumption Wa exceeds a continuous maximum capacity Wmax, e.g., 170 watts of the power supply 50.

The current power consumption and additional power consumption required to execute the new operation command can be calculated based on the operation mode and corresponding power consumption shown in FIG. 5, which will be described later. The operation modes and corresponding power consumption are stored in the setting information memory 77 in advance.

In S12, the CPU 73 makes a decision to determine whether a new command is received. If a new command is received, the program proceeds to S14. If a new command is not received, the program process to S13.

In S13, the CPU 73 makes a decision to determine whether the current operation mode has completed. If NO, the program returns to S12. If YES, the program proceeds to S30.

In S14, the CPU 73 makes a decision to determine whether a newly commanded operation can be performed concurrently with the operation that is currently being performed. If YES, the program proceeds to S20. If NO, the program proceeds to S15 where the newly commanded operation is temporarily held in the setting information memory 77, and then proceeds to S12.

The operation in S14 will be described in a more specific manner. Assume that a scanning operation is commanded when the image forming apparatus 10 is operating in the copy mode. At this moment, the scanner unit 64 and print engine 79 are operating in the copy mode. For this reason, the image forming apparatus 10 cannot immediately accept the scanning operation that involves the scanner unit 64. When the scan command is received, the scanner unit 64 is operating in the scan mode. For this reason, a FAX transmission command cannot be accepted, since execution of the FAX transmission command involves the scanner unit 64 as currently is used in the currently executed operation. In this manner, any operation command cannot be accepted if that operation command involves the hardware currently in use, and is therefore left unexecuted until the currently executed operation has completed.

The same is true for a FAX transmission command received when the image forming apparatus 10 is in the scan mode. For example, when a FAX transmission command is received, the scanner unit 64 is operating in the scan mode. Thus, the FAX transmission command cannot be accepted, since execution of the FAX transmission command involves the scanner unit 64 as currently is used in the scan mode. In this manner, any operation command cannot be accepted if that operation command involves the hardware that is currently used, and is therefore left unexecuted until the currently executed operation has completed.

In S20, the CPU 73 adds the power consumption involved in the newly accepted operation command to the total power consumption Wa.

In step S21, the CPU 73 makes a decision to determine whether the total power consumption Wa is greater than 170 watts, which is a continuous maximum capacity Wmax (shown in FIG. 6) of the power supply 50. If Wa≤Wmax, the program proceeds to S12.

In S22, the image recording section 70 halts the operation in a high-speed printing mode after all of the sheets of printing paper remaining in the transport paths 101A and 101B have been printed and discharged, and then no sheet of paper 100 is fed to the transport paths 101A and 101B.

In S23, the image recording section 70 performs a preparatory operation for slowing the printing operation to slow the printing operation. The preparatory operation for slowing the printing operation involves production of image data for printing at low-speed, adjustment of the paper transporting speed in accordance with the image data for slow printing operation, adjustment of the temperature of the fixing unit 40 in accordance with the paper transporting speed, and adjustment of bias voltages applied by the power supply 50 to the respective sections in the respective image forming sections 20.

In S24, the image recording section 70 shifts from the high-speed printing mode to a low-speed printing mode.

In S25, the CPU 73 decrements the total power consumption Wa by 30 watts, which is the difference between the power consumption (160 watts) in the high-speed printing and the power consumption (130 watts) in the low-speed mode.

In S26, the image forming apparatus 10 executes the newly received operation command, and then jumps back to S12.

In S30, the CPU 73 decrements the total power consumption Wa by the power consumption for the completed operation command.

In S31, the CPU 73 makes a decision to determine whether any operation command remains in queue. If an operation command remains in queue, the program proceeds to S14. If no operation command is in queue, the program jumps back to S12.

In other words, upon reception of an operation command for scanning during a printing mode, the CPU 73 which is a decision section forecasts the total power consumption Wa based on the printing mode and scan mode. If the total power consumption Wa exceeds the continuous maximum capacity Wmax, the CPU 73 halts the high-speed printing mode and then starts to execute the operation command in the scan mode and then performs printing in the low-speed printing mode.

FIG. 5 illustrates the relationship among the operation modes, power consumption, and involved sections in the first embodiment.

For example, if the operation is in the scan mode, the power consumption is 30 watts and the involved section is the scanner unit 64.

Likewise, if the operation is in the low-speed printing mode, the power consumption is 130 watts and the involved section is the print engine 79. If the operation is in the high-speed printing mode, the consumption is 160 watts and the involved section is the print engine 79.

If the operation is in the copy mode, the power consumption is 160 watts and the involved section is the scanner unit 64.

If the operation is in the FAX transmission mode, the power consumption is 40 watts, and the involved sections are the scanner unit 64 and FAX section 63: If the operation is in the FAX reception mode and only the FAX section 63 is involved, the power consumption is 10 watts.

The value of power consumption in the respective modes are maximum values measured in advance, and are stored together with the names of corresponding sections in the respective modes in the memory 70. The relationship between the operation mode and corresponding power consumption is referred to in S20 of the flowchart shown in FIG. 4. Similarly, the relationship between the operation mode and the corresponding involved section is referred to in S14 of the flowchart shown in FIG. 4.

Figure 6:
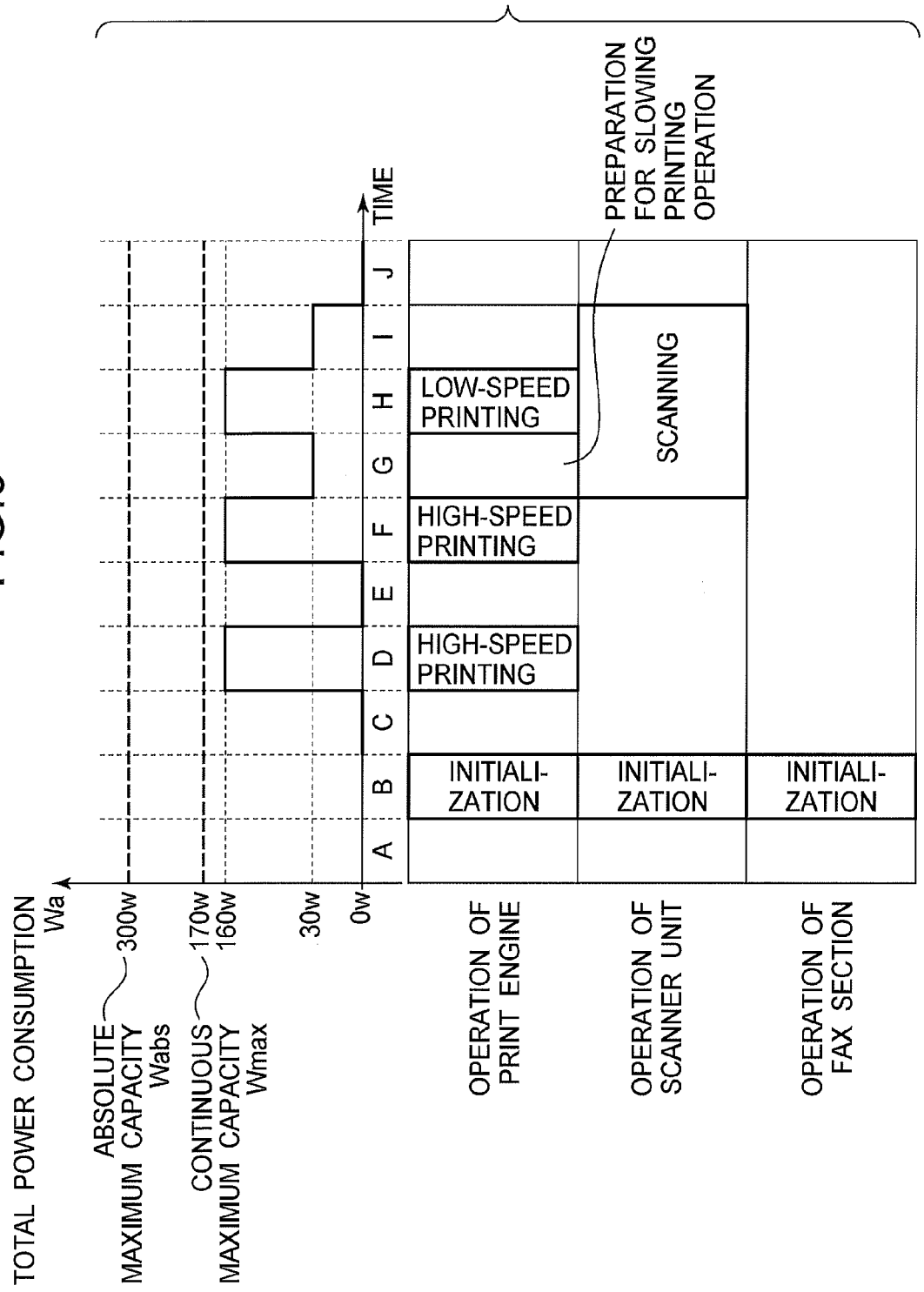
FIG. 6 illustrates the change in the total power consumption after power-on of the image forming apparatus according to the first embodiment.

FIG. 6 illustrates the change in the total power consumption after power-on of the image forming apparatus 10 according to the first embodiment.

Absolute maximum capacity Wabs is a maximum value of power that can be safely drawn from the power supply 50 and is 300 watts in the first embodiment. Therefore, the power that is drawn from the power supply must be below the absolute maximum capacity Wabs at any moment. The continuous maximum capacity Wmax is a maximum value of power that can be drawn safely continuously from the power supply 50, and is 170 watts in the first embodiment.

In a period A, the image forming apparatus 10 is powered on and starts to operate. At this point of time, the CPU 73 does not start to monitor the total power consumption Wa.

In a period B, the CPU 73 performs initialization of the associated LSIs and the data storing memory 76. The CPU 73 also initializes the print engine 79 and establishes the communication between the print engine 79 and scanner unit 64 and the communication between the print engine 79 and FAX section 63. During the period B, the CPU 73 does not start to monitor the total power consumption Wa.

In a period C, the image forming apparatus 10 enters a standby state. The CPU 73 then starts to monitor any operation command. The CPU 73 also monitors the total power consumption Wa that reflects any operation command. The total power consumption Wa is zero watts initially.

In a period D, the image forming apparatus 10 receives a print command from the host computer 200, and operates in the high-speed printing mode. The CPU 73 monitors the currently executed operation to detect when the currently executed operation has been completed, and also continuously watch for a new operation command. The total power consumption Wa in the period D is 160 watts.

In a period E, the image forming apparatus 10 completes the operation in the high-speed printing mode, and then enters the standby mode. Upon completion of the operation in the high-speed printing mode, the CPU 73 reads the value of power consumption of the just completed operation from the setting information memory 77, and then decrements the total power consumption Wa by 160 watts, so that the total power consumption Wa in the period C is now zero watts.

In a period F, the image forming apparatus 10 receives print data and a print command from the host computer 200, and is then placed in the high-speed printing mode. The total power consumption Wa in the period F is 160 watts.

When operating in the high-speed printing mode in the period F, the image forming apparatus 10 receives a scan command from the user via the human interface 65. The currently executed operation command does not involve the scanner unit 64. However, the power consumption in the scan mode is 30 watts and therefore, the total power consumption Wa is the sum of the power consumption (160 watts) in the high-speed printing mode and that (30 watts) in the scan mode. The sum is 190 watts, which is greater than the continuous maximum capacity Wmax (170 watts).

Thus, in a period G, the CPU 73 issues a command to the print engine 79 to quit the high-speed printing mode, starts the preparatory operation for slowing the printing operation, and operates in the scan mode, so that the image forming apparatus 10 enters the low-speed printing mode in a period H. The power consumption in the low-speed printing mode is 130 watts which is smaller than that in the high-speed printing mode by 30 watts. The power consumption in the preparatory operation for slowing the printing operation is negligibly small compared to that (30 watts) in the scan mode. For this reason, the sum of the power consumption (30 watts) in the scan mode and the power consumption (130 watts) in the low-speed printing mode is 160 watts, which is smaller than the continuous maximum capacity Wmax (170 watts). Therefore, a small capacity power supply 5'0 can still operate the image reading section 60 and image recording section 70 simultaneously.

In a period I, the image forming apparatus 10 completes the operation in the low-speed printing mode, and there is no operation command in queue. The scanner unit 64 continues to operate in the period I, and the total power consumption Wa is 30 watts.

In a period J, the image forming apparatus 10 completes the operation in the scan mode, and enters the standby state. The total power consumption Wa in the period J is zero watts.

Effects of First Embodiment

The first embodiment provides the following advantages. The image forming apparatus 10 is an MFP incorporating the image reading section 60 and image recording section 70. The small capacity power supply 50 is capable of driving both the image reading section 60 and image recording section 70 simultaneously.

When the image forming apparatus 10 is operating in the high-speed printing mode, if the user inputs an additional operation command that involves both the image reading section 60 and image recording section 70, the image forming apparatus first halts the operation in the high-speed printing mode, and then starts to execute the additional operation command promptly, and then the image recording section 70 shifts to the low-speed printing mode. This configuration permits the small capacity power supply 50 to drive both the image reading section 60 and image recording section 70 concurrently.

Second Embodiment

Figure 7:
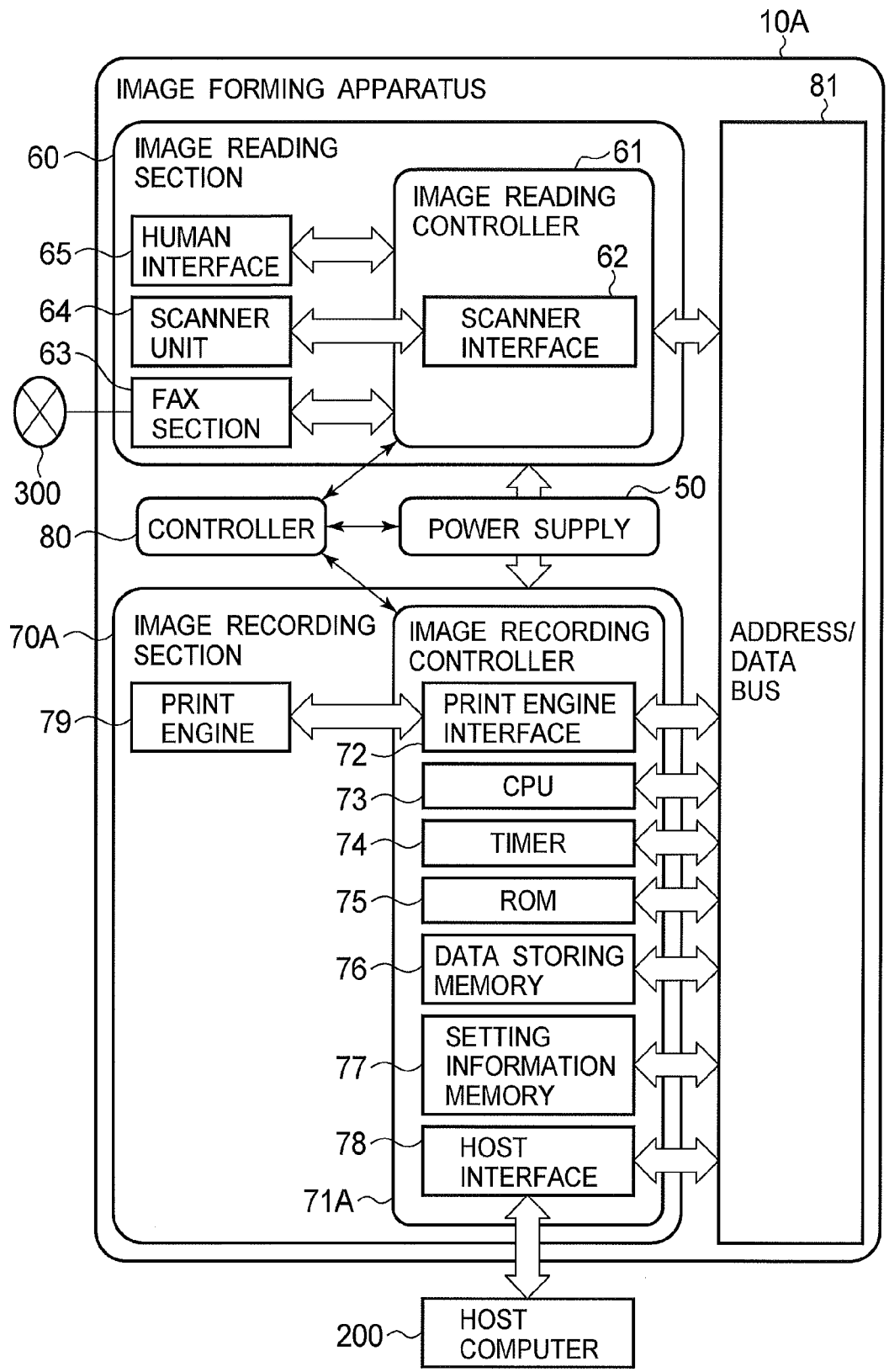
FIG. 7 illustrates the general configuration of an image forming apparatus according to a second embodiment.

FIG. 7 illustrates the general configuration of an image forming apparatus 10A according to a second embodiment. Elements similar to those in the first embodiment have been given the same reference characters.

The image forming apparatus 10A has substantially the same configuration as the image forming apparatus 10 except that an image recording section 70A is used.

The image recording section 70A differs from the image recording section 70 in that an image recording controller 71A is used.

The image recording controller 71A includes a timer 74 connected to an address/data bus 81. The timer 74 measures a time elapsed from a predetermined reference.

{Operation}

Figure 8:
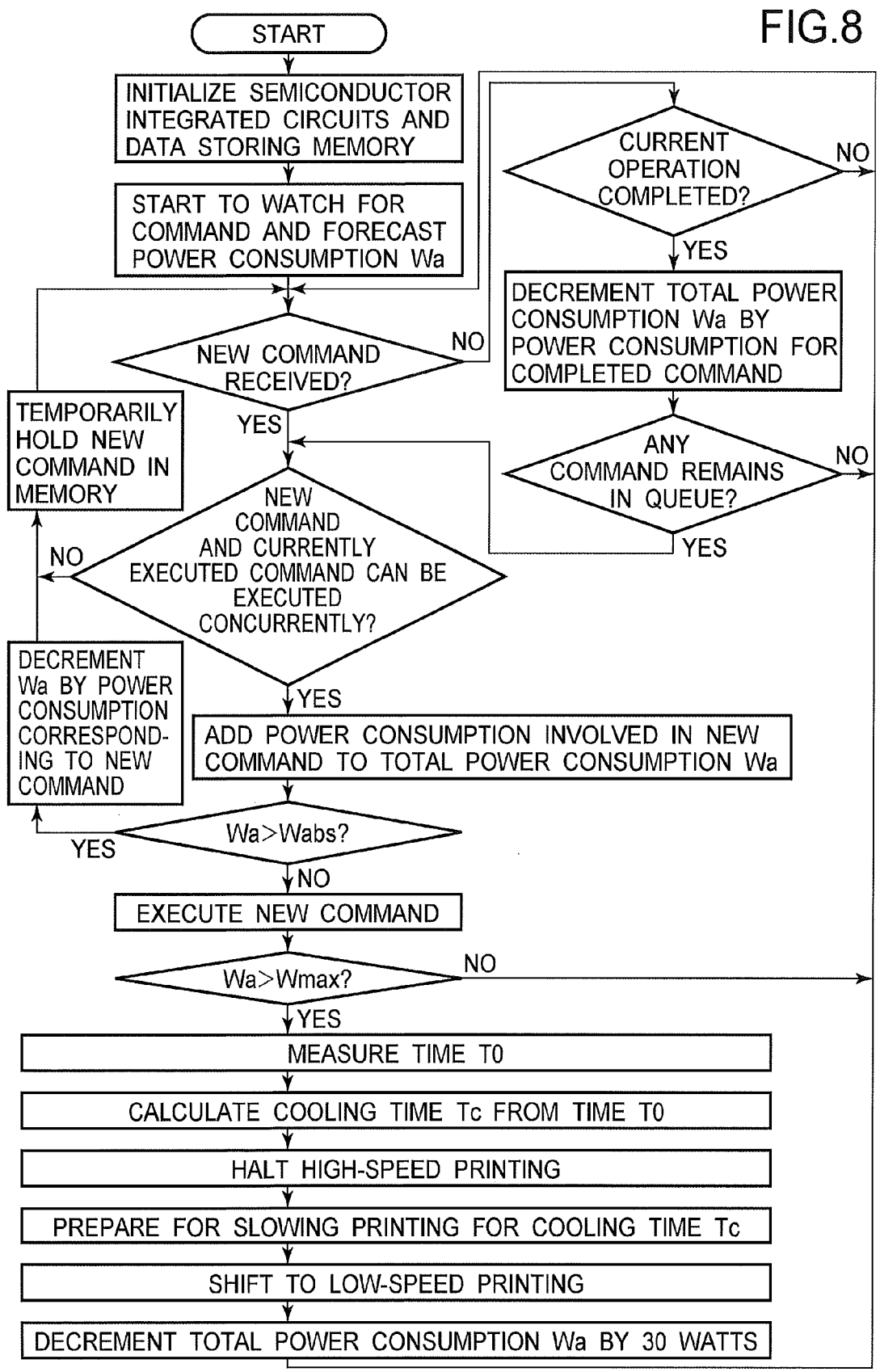
FIG. 8 is a flowchart illustrating the operation of the image forming apparatus shown in FIG. 7.

FIG. 8 is a flowchart illustrating the operation of the image forming apparatus 10A.

S10-S15 shown in FIG. 8 are the same as S10-S15 in the first embodiment.

In S20, a CPU 73 adds the power consumption corresponding to a new operation command to total power consumption Wa.

In S20A, if the total power consumption Wa is greater than absolute maximum capacity Wabs which is a maximum value of power that can be drawn from the power supply 50, then in S16, the CPU 73 decrements the total power consumption Wa by the power consumption corresponding to the newly commanded operation. In S15, the CPU 73 sores the newly commanded operation into a setting information memory 77 and then returns to S12. If the total power consumption Wa is not greater than the absolute maximum capacity Wabs, then the program proceeds to S26A. As described above, the CPU 73 controls the total power consumption Wa so that the total power consumption Wa is always smaller than the absolute maximum capacity Wabs.

In S26A, the CPU 73 executes the newly commanded operation.

In S21, if the total power consumption Wa exceeds the continuous maximum capacity Wmax, then the program proceeds to S40. If the total power consumption Wa does not exceed the absolute maximum capacity Wabs, the program jumps back to S12.

In S40, the CPU 73 causes the timer 74 to measure an excess power consumption time T0 from the beginning of the operation in the scan mode until the printing operation in a high-speed printing mode has completed. The excess power consumption time T0 is the time duration during which the total power consumption Wa exceeds the continuous maximum capacity Wmax.

In S41, the CPU 73 calculates a cooling time Tc which is a time duration during which the power supply 50 is being cooled. The cooling time Tc is given by equation (1) as follows:

$$Tc = \frac{\{W\max - Wa1\}}{\{W\max - Wa2\}} \times T0 \qquad \text{Eq. (1)}$$

where Mmax is the continuous maximum capacity of the power supply 50, T0 is the time duration during which the total power consumption Wa exceeds the continuous maximum capacity Wmax, Wa1 is the total power consumption during the excess power consumption time T0, and Wa2 is the total power consumption during a preparatory operation for slowing the printing operation.

In S22, the image recording section 70A halts the operation in the high-speed printing mode, and then in S23A, the image recording section 70A performs the preparatory operation for slowing the printing operation during the cooling time Tc. In S24, the image recording section 70A shifts to a low-speed printing mode, and decrements the total power consumption Wa by 30 watts in S25. S22, 24, and 25 are the same as S22, S24, and S25 in the first embodiment. S30 and S31 are the same as S30 and S31 in the first embodiment.

In other words, when the image forming apparatus is operating in the printing mode, if the user inputs an operation in the scan mode, the CPU 73 estimates the total power consumption Wa based on the power consumption in the printing mode and scan mode. If the total power consumption Wa is greater than the continuous maximum capacity Wmax, the CPU 73 causes the timer 74 to measure the excess power consumption time T0 and calculates the cooling time Tc based on the excess power consumption time T0. The CPU 73 halts the operation in the high-speed printing mode, and then executes the operation in the scan mode. At the end of the cooling time Tc, the CPU 73 places the image forming apparatus 10A in the low-speed printing mode.

The operation of the image forming apparatus 10A during periods G1-H will be described by comparing the operation of the image forming apparatus 10 shown in FIG. 9 with that of the image forming apparatus 10A.

Figure 9:
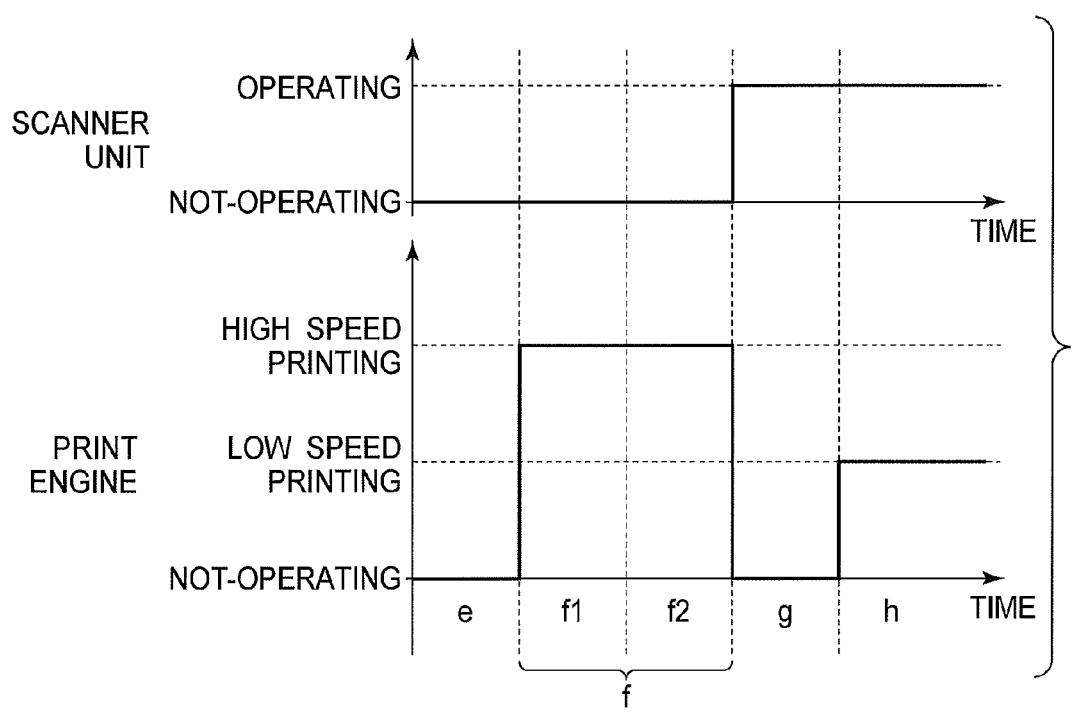
FIG. 9 illustrates the preparatory operation for slowing the printing operation according to the second embodiment.

FIG. 9 illustrates the preparatory operation for slowing the printing operation according to the first embodiment. Elements similar to those shown in FIG. 6 have been given the same reference characters.

The upper portion of FIG. 9 illustrates the change in the operation of a scanner unit 64 with time and the lower portion illustrates the change in the operation of a print engine 79 with time.

In a period E, the scanner 64 and print engine 79 are halted and the power consumption of the image forming apparatus 10A remains minimum.

In a period F1, the print engine 79 operates in the high-speed printing mode while the scanner unit 64 remains halted.

In a period F2, the image forming apparatus 10A receives a scan command while the print engine 79 continues to operate in the high-speed printing mode, and the scanner still remains halted. The period F1 and F2 are equivalent to the period F shown in FIG. 6.

In a period G, the print engine 79 halts the operation in the high-speed printing mode, and the scanner unit 64 starts the preparatory operation for slowing the printing operation.

In a period H, the print engine 79 operates in the low-speed printing mode.

In the flowchart shown in FIG. 4, the image recording section 70 if the Wa>Wmax in S21, the program proceeds to S23 where the preparatory operation for slowing the printing operation is executed and then the image forming apparatus 10A enters the low-speed printing mode. Consequently, while the image recording section 70 waits for the print engine 79 to halt its operation in the high-speed printing mode, the scanner unit 64 and print engine 79 are unable to operate simultaneously.

By the time the print engine 79 receives a command to operate in the low-speed printing mode, the image data has been ready to print, and the respective rollers have been set to operate to perform the operation in the high-speed printing operation mode. Further, the temperature of the fixing unit 40 has been ready for the operation in the high-speed printing mode and the high voltage power supply 51 has set the bias voltages for the respective portions in the image forming sections 20. Therefore, in order to suspend an operation in the high-speed printing mode, all sheets of the recording paper 100 being transported in the transport paths 101a and 101B must be printed on and then discharged. If the image forming apparatus 10 incorporates a duplex printing mechanism, it takes about 30 seconds before printing has been completed for all the sheets of recording paper 100 remaining in the transport paths and in a router for duplex printing mode can be printed. In other words, the user must wait quite a long time before the operation in the high-speed printing mode is halted.

Figure 10:
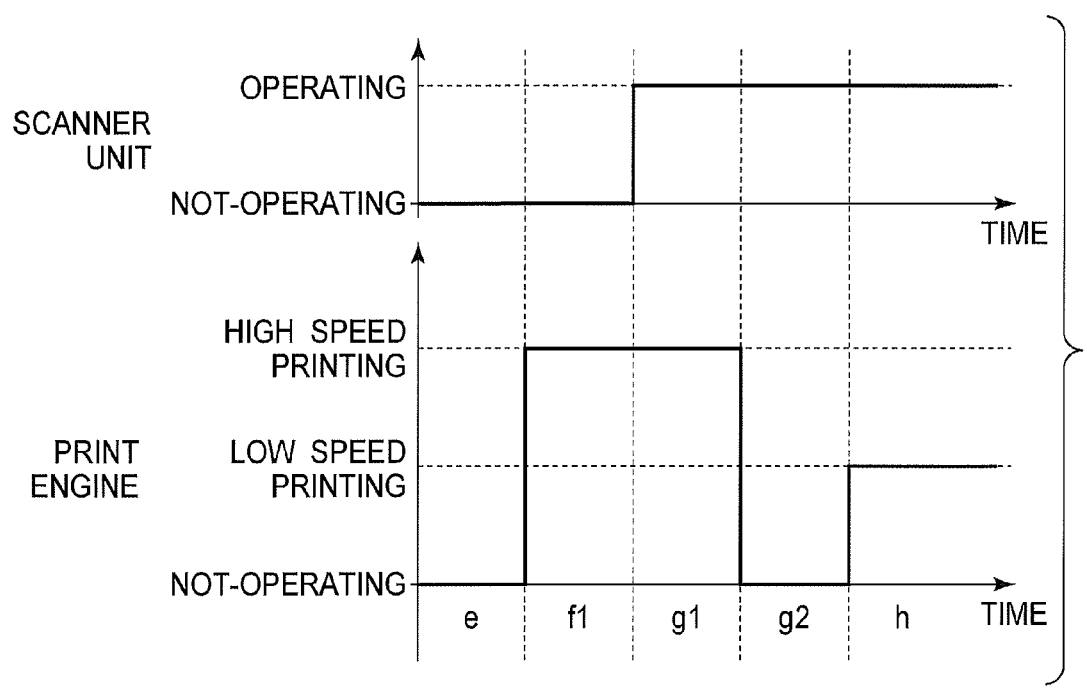
FIG. 10 illustrates the operation for the print engine to slow down.

FIG. 10 illustrates the operation for the print engine to slow down. Elements similar to those shown in FIG. 9 have been given like reference characters.

The upper portion of FIG. 10 illustrates the change in the operation of the scanner unit 64 with time, and the lower portion illustrates the change in the operation of the print engine 79 with time.

The operation during periods E and F1 is the same as that during the periods E and F1 of the first embodiment. In a period G1, the scanner unit 64 initiates the operation in the scan mode. The scanner unit 64 continues to operate during the periods G1, G2, and H. The image forming apparatus 10A has a feature that when the user inputs the scan command, the scanning operation is initiated promptly without waiting for the operation in the high-speed printing mode to be suspended.

The operation during the periods G2 and H are the same as that during the periods G and H in the first embodiment. FIG. 11 illustrates the change in the total power consumption after power-on of the image forming apparatus 10A. Elements similar to those shown in FIG. 6 have been given the same reference characters.

The operation during the periods A to E is the same as that during periods A to E shown in FIG. 6. In the period F, the image forming apparatus 10A operates in the high-speed printing mode in response to a print command and print data received from a host computer 200. The total power consumption Wa during the period D is 160 watts.

In a period G1, the image forming apparatus 10A receives the scan command from a human interface 65. Since the scanner unit 64 is not involved in the currently executed operation, the scanner unit 64 is ready to operate.

The image forming apparatus 10A is capable of executing a new operation command promptly as long as the total power consumption Wa, which includes the power consumption required for executing the new operation, does not exceed the absolute maximum capacity Wabs. In the period G1, the total power consumption Wa is 190 watts, which is the sum of the power consumption (30 watts) required for the scan mode and the power consumption (160 watts) required for the operation in the high-speed printing mode.

The total power consumption Wa exceeds the continuous maximum capacity Wmax during the period G1. In other words, the power supply 50 supplies electric power in excess of the continuous maximum capacity Wmax. The CPU 73 calculates the cooling time Tc based on the excess power consumption time T0.

Assume that the excess power consumption time T0 is 14 seconds and the total power consumption Wa is 190 watts during the T0. The excess power is 20 watts (i.e., Wa−Wmax), requiring the cooling time Tc for dissipating the heat generated by supplying 20 watts for 14 seconds.

In the period G2, the image forming apparatus 10A executes the preparatory operation for slowing the printing operation so that the print engine 79 shifts from the high-speed printing mode to the low-speed printing mode. Also, the scanner unit 64 operates in the scan mode. The power supply 50 supplies 30 watts of power to the scanner unit 64, and is therefore capable of supplying additional 140 watts of power (=170−30 watts). Therefore, the power supply 50 generates less heat than when it is supplying the continuous maximum capacity Wmax. This makes it possible to cool down the image forming apparatus 10A by heat dissipation.

Electric energy is given by multiplying electric power by time. The electric energy drawn from the power supply 50 during the period G1 (14 seconds) is given by 20 watts×14 seconds, i.e., 280 watt-seconds (Ws). Thus, heat corresponding to 280 Ws of electric energy is generated in the power supply 50. This heat can be dissipated if less power is drawn from the power supply 50 than when the continuous maximum capacity Wmax is drawn. In the period G2, the cooling time Tc is given by 280 Ws divided by 140 watts (=2 seconds), where 140 watts is the difference between the continuous maximum capacity Wmax and the total power consumption Wa when the printing is halted.

In other words, the cooling time Tc is given by equation (2) as follows:

$$Tc = \frac{(W\max - Wa1)T0}{W\max - Wa2} \qquad \text{Eq. (2)}$$

where T0 is the cooling time, Wa1 is the total power consumption during T0, Wa2 is the total power consumption when the print engine operates in the low-speed mode, Wmax is the continuous maximum capacity of the power supply.

The period G2 is either the cooling time Tc or the time required for the preparatory operation for slowing the printing operation, whichever is longer. In this manner, the cooling time Tc is employed for dissipating excess heat generated due to the supplying of power during the period G1, thereby permitting immediate execution of a newly commanded operation without having to halt the operation in the high-speed printing mode.

The operation of the image forming apparatus during periods I and J are the same as that during the periods I and J shown in FIG. 6.

For the image forming apparatus 10A, the total power consumption Wa during the period G1 is 190 watts, which exceeds the continuous maximum capacity Wmax (=170 watts) of the power supply 50.

The power supply 50 is a switching mode power supply, and its continuous maximum capacity Wmax depends on the electrical ratings and thermal characteristics of electrical components.

Generally speaking, in the design of a power supply capable of supplying a desired continuous maximum capacity Wmax, it is often important not only to use electrical components within their manufacture's ratings, but also to design cooling conditions in order to meet the upper temperature limit of the power supply. In other words, heat generation is a key factor that affects the continuous maximum capacity Wmax of the power supply 50. Power conversion loss is converted into heat. Thus, the more power is drawn from the power supply 50, the more heat is generated. Conversely, when less power is drawn, less heat is generated. The continuous maximum capacity Wmax of the power supply 50 is designed taking into account the rush current shortly after power-up of the image forming apparatus, pulse-like short time loads that occur when motors are energized, and short time heat generation. Therefore, the power supply 50, which is a switching mode power supply, is designed to operate with a sufficient cooling time for dissipating heat generated due to short time excessive loads, thereby supplying electric power in excess of the continuous maximum capacity Wmax.

When the image forming apparatus 10A receives an operation in the scan mode or in the FAX transmission mode while the image forming apparatus 10A is operating in the printing mode, the CPU 73 estimates new total power consumption Wa based on the current printing mode and the newly commanded operation. If the total power consumption Wa exceeds the continuous maximum power Wmax, the timer 74 measures the time T0 during which the total power consumption Wa exceeds the continuous maximum power Wmax. The CPU then calculates the cooling time Tc during which the power supply 50 is cooled, and then the current operation in the printing mode is suspended. When the cooling time Tc is reached, the image recording section 70 shifts from the high-speed printing mode to the low-speed printing mode.

The cooling time Tc is given by equation (3) as follows:

$$Tc = \frac{(W\max - Wa1)T0}{W\max - Wa3} \qquad \text{Eq. (3)}$$

where T0 is the cooling time, Wa1 is the total power consumption during the T0, Wa3 is the total power consumption when the current printing operation is halted, Wmax is the continuous maximum capacity of the power supply.

Effects of First Embodiment

When sheets of recording paper 100 are being trans in the apparatus 10A during the operation in the high-speed printing mode, if the user inputs the scan command or the FAX transmission command via the human interface 65, the scanning operation is initiated promptly without waiting for the print engine 79 to discharge all the sheets.

{Modification}

The invention may be modified in a variety of ways without departing from the scope of the invention. The invention may be modified as follows:

The invention is not limited to the first and second embodiments and may be applied to a variety of apparatus including multi function FAX machines, copying machines, and other peripheral devices.

In the second embodiment, the timer 74 measures the excess power consumption time T0 from initiation of the operation in the scan mode until all of the sheets of recording paper 100 printed in the high-speed printing mode have been discharged. During the T0, the forecasted total consumption power Wa exceeds the continuous maximum capacity of the power supply Wmax. The T0 is short and the Tc calculated based on the T0 is a very short time. Thus, the Tc may be given by equation (4) as follows:

$$Tc = \frac{(W\max - Wa4)T\max}{(W\max - Wa5)} \qquad \text{Eq. (4)}$$

where Wmax is the continuous maximum capacity, Tmax is the time required for the sheets of the recording paper 100 printed in the high-speed printing to be discharged, Wa4 is the forecasted total consumption power Wa at Tmax, and Wa5 is the forecasted total consumption power Wa when the operation in the high speed printing mode is halted.

In the first and second embodiments, if the total power consumption Wa exceeds the continuous maximum capacity Wmax, the operation in the high-speed printing mode is suspended and then the operation is shifted to the low-speed printing mode. The invention is not limited to this. The currently executed operation in, for example, the scan mode, copying mode, or FAX transmission mode may be suspended and then the image forming apparatus may be switched to the operation in a low-speed mode, thereby decreasing the total power consumption Wa so that the image reading section 60 and image recording sections 70 and 70A may be operated simultaneously.

In the second embodiment, a new operation command is promptly received when the user inputs the new command via the human interface 65, all of the sheets being transported within the image forming apparatus 10A, and then the preparatory operation for slowing the printing operation is executed, and finally the operation is executed in the low-speed printing. The invention is not limited to this. The image forming apparatus 10A may, be modified such that a decision is made to determine whether the electric energy when the currently executed job has been completed does not exceed a predetermined electric energy that can safely drawn from the power supply 50. If the electric energy when currently executed job has been completed does not exceed a predetermined electric energy, a new operation command is promptly executed while also continuing to print the entire currently executed print job. In this manner, if the currently executed print job is small in size, execution of the newly commanded operation will not prolong the time required for the user to wait for the print-out of his print job.

In the second embodiment, the timer 74 measures the time T0 during which the power supply 50 temporarily outputs an amount of electric energy that exceeds the continuous maximum capacity Wmax. The cooling time Tc is calculated based on the amount of electric energy and the time T0. The control is performed so that the power supply 50 does not output electric power exceeding the continuous maximum capacity Wmax during the Tc. The invention is not limited to this. The current temperature of the power supply 50 may be calculated based on the heat generated by the total power consumption Wa, heat lost from the power supply 50 due to convection, conduction, and radiation, and the specific heat of the power supply 50. The control may then be made depending on whether the current temperature exceeds a temperature below which the operation of the power supply 50 is guaranteed. Supplying the total power consumption Wa for the T0 causes the temperature to increase from T1 to T2. Supplying the total power consumption below Wmax causes the temperature to decrease from T2 to T1. The cooling time Tc is a time required for the temperature T2 to decrease to T1.

The invention being thus described, it will be obvious that the same may be varied in many ways. Such variations are not to be regarded as a departure from the scope of the invention, and all such modifications as would be obvious to one skilled in the art intended to be included within the scope of the following claims.

What is claimed is:

1. An image forming apparatus including a plurality of operation modes, comprising:
    an image reading section configured to read image information from an original document;
    an image recording section configured to record the image information on a recording medium selectively in a first operation mode where the image recording section operates at a first speed and in a second operation mode where the image recording section operates at a second speed lower than the first speed;
    an electric power supply configured to supply electric power to the image reading section and the image recording section;
    a controller that controls the image recording section;
    a computing section configured to compute total power consumption supplied to the image forming apparatus from the electric power supply when the image forming apparatus operates in a given one or more of the plurality of operation modes; and
    a determining section configured to determine whether the total power consumption exceeds a reference value;
    wherein when the image recording section is operating in the first operation mode, if the image forming apparatus receives an operation command for a third operation mode and if the determining section determines that the total power consumption exceeds the reference value, the controller, after driving the image recording section to operate in the first operation mode for a first period of time, drives the image recording section to operate in a cooling mode for a second period of time, and then shifts the image recording section to the second operation mode, the first period of time being a period of time during which the total power consumption exceeds the reference value; and
    wherein the second period of time is given by $$Tc = \frac{\{W\max - Wa1\}}{\{W\max - Wa2\}} \times T0$$

where W max is the reference value, T0 is the first period of time, Wa1 is the total power consumption during the first period of time, and Wa2 is the total power consumption during the second period of time.

2. The image forming apparatus according to claim 1, wherein the total power consumption is smaller than an absolute maximum capacity, the absolute maximum capacity being a maximum value of electric power that can be drawn from the power supply.

3. The image forming apparatus according to claim 1, wherein the first operation mode is a high-speed printing mode, the second operation mode is a low-speed printing mode, and the third operation mode is a scan mode or a facsimile mode.

4. The image forming apparatus according to claim 1, wherein the image forming apparatus performs the first operation mode and the third operation mode concurrently.

5. The image forming apparatus according to claim 1, wherein the image forming apparatus performs the second operation mode and the third operation mode concurrently.

* * * * *